US006805850B2

(12) United States Patent
Ishikawa (10) Patent No.: US 6,805,850 B2
(45) Date of Patent: Oct. 19, 2004

(54) CO-SHIFT DEVICE

(75) Inventor: Takashi Ishikawa, Toyota (JP)

(73) Assignee: Aisin Seiki Kabushki Kaisha, Kariya (JP)

( * ) Notice: Subject to any disclaimer, the term of this patent is extended or adjusted under 35 U.S.C. 154(b) by 168 days.

(21) Appl. No.: 10/100,018

(22) Filed: Mar. 19, 2002

(65) Prior Publication Data

US 2002/0141924 A1 Oct. 3, 2002

(30) Foreign Application Priority Data

Mar. 19, 2001 (JP) ........................................ 2001-079293

(51) Int. Cl.[7] .............................. C01B 3/12; C01B 3/16; B01J 8/04
(52) U.S. Cl. ..................... 423/655; 423/437.2; 422/188; 422/189; 422/191; 422/198; 422/211
(58) Field of Search ................................ 422/188, 189, 422/191, 198, 211; 423/437.2, 655, 656

(56) References Cited

U.S. PATENT DOCUMENTS

| | | | |
|---|---|---|---|
| 3,127,247 A | * | 3/1964 | Davis .......................... 422/188 |
| 6,284,398 B1 | | 9/2001 | Kiryu ........................... 429/19 |

FOREIGN PATENT DOCUMENTS

| | | | |
|---|---|---|---|
| CA | 2 335 483 | 12/2000 | |
| EP | 922666 A1 | * 6/1999 | ............. C01B/3/48 |

OTHER PUBLICATIONS

Perry et al., Perry's Chemical Engineers' Handbook, 7th Edition, McGraw–Hill, 1997, pp. 19–22–19–23.*

* cited by examiner

Primary Examiner—Stanley S. Silverman
Assistant Examiner—Maribel Medina
(74) Attorney, Agent, or Firm—Oblon, Spivak, McClelland Maier & Neustadt, P.C.

(57) ABSTRACT

A CO-shift device includes a main body having therein a space in which a CO-shift catalyst is accommodated, the space being divided into an inner space and an outer space surrounding the inner space; an inlet portion formed at one end portion of the inner space, the inlet portion being supplied with a reformed gas such that the reformed gas flows through the inner space. An outlet portion is formed at one end portion of the outer space and a redirecting portion is provided between the other end portion of the inner space and the other end portion of the redirecting portion, thereby reversing the reformed gas flown into the other end of the inner space in order that the resulting reformed gas passes through the outer space to be exhausted from the outlet portion, the reformed gas being shifted to reduce CO by the CO-shift catalyst during its movement through the inner and outer spaces.

12 Claims, 11 Drawing Sheets

CO-SHIFT DEVICE

CROSS REFERENCE TO RELATED APPLICATION

The present application is based on and claims priority under 35 U.S.C. §119 with respect to Japanese Patent Application No-2001-079293 on Mar. 19, 2001 (13th Year of Heisei), the entire content of which is incorporated herein by reference.

BACKGROUND OF THE INVENTION

1. Field of The Invention

The present invention is generally directed to a CO-shift device which shifts carbon monoxide into carbon dioxide.

2. Description of the Related Art

Japanese Patent Laid-open Publication No. 2000-302405 discloses such a CO-shift device. In this CO-shift device, the following chemical reaction occurs.

$$CO+H_2O \leftrightarrows H_2+CO2+Q \text{(Heat Generation)}$$

For reacting CO effectively in the above-mentioned reaction formula, the reaction temperature is required to decrease. However, due to the heat generation reaction, as the reaction proceeds, the temperature is increased, resulting in difficulty in progress in the rightward direction in the above reaction formula.

In addition, lowering the reaction temperature causes the reaction speed to slow, and to avoid such a phenomena the CO-shift device has to be enlarged in capacity.

Moreover, the above-mentioned CO-shift device is provided at its downstream side with a heat exchanger, and the temperature in the CO-shift device is controlled to reduce CO effectively. However, such a structure makes the fuel cell system complicated.

Thus, a need exists to provide a CO-shift device which is free from the aforementioned drawbacks.

SUMMARY OF THE INVENTION

In accordance with a first aspect of the present invention, a CO-shift device comprises a main body having therein a space in which a CO-shift catalyst is accommodated, the space being divided into an inner space and an outer space surrounding the inner space; an inlet portion formed at one end portion of the inner space, the inlet portion being supplied with a reformed gas such that the reformed gas flows through the inner space; an outlet portion formed at one end portion of the outer space; and a redirecting portion provided between the other end portion of the inner space and the other end portion of the redirecting portion, thereby reversing the reformed gas flown into the other end of the inner apace in order that the resulting reformed gas passes through the outer space to be exhausted from the outlet portion, the reformed gas being shifted to reduce CO by the CO-shift catalyst during its movement through the inner and outer spaces.

In accordance with a second aspect, in a CO-shift device according to the first aspect, the main body is made up of a pair of inner and outer cylindrical members which have a common axis, the inner space being defined in the inner cylindrical member, the outer space being defined between the inner and outer cylindrical members.

In accordance with a third aspect, a CO-shift device according to the first aspect is modified such that the redirecting portion is free from catalyst installation.

In accordance with a fourth aspect, a CO-shift device according to the first aspect is modified such that the catalyst is supported by a set of a punched plate and a meshed plate, each of the holes of each of the plates being smaller than the catalyst particle diameter.

In accordance with a fifth aspect, a CO-shift device according to the first aspect is modified such that a heat-recovering device is provided which is in the form of a passage, the passage being formed on an outer surface of an outer wall of the main portion, for recovering a heat generated during CO-shift reaction by a coolant when the coolant passes through the passage.

In accordance with a sixth aspect, a CO-shift device according to the first aspect is modified such that a heat-recovering device is provided which is in the form of a passage, the passage being formed on an outer surface of an outer wall of the main portion, for recovering a heat generated during CO-shift reaction by a coolant when the coolant passes through the passage.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Hereinafter, embodiments of the present invention will be described in detail with reference to the attached drawings.

Referring first to FIGS. 1 to 10 inclusive, there is illustrated a fuel reformer which includes a reforming portion 2 which surrounds a burner 1 which forms a flame and a heat exchanger 4 for establishing heat exchange between a raw material gas and a reformed gas fed or exhausted from the reforming portion 2. The fuel reformer provides a direct connection between an exhaust port 22 of the reforming portion 2 and a higher temperature side of the heat exchanger 4.

Figure 1:
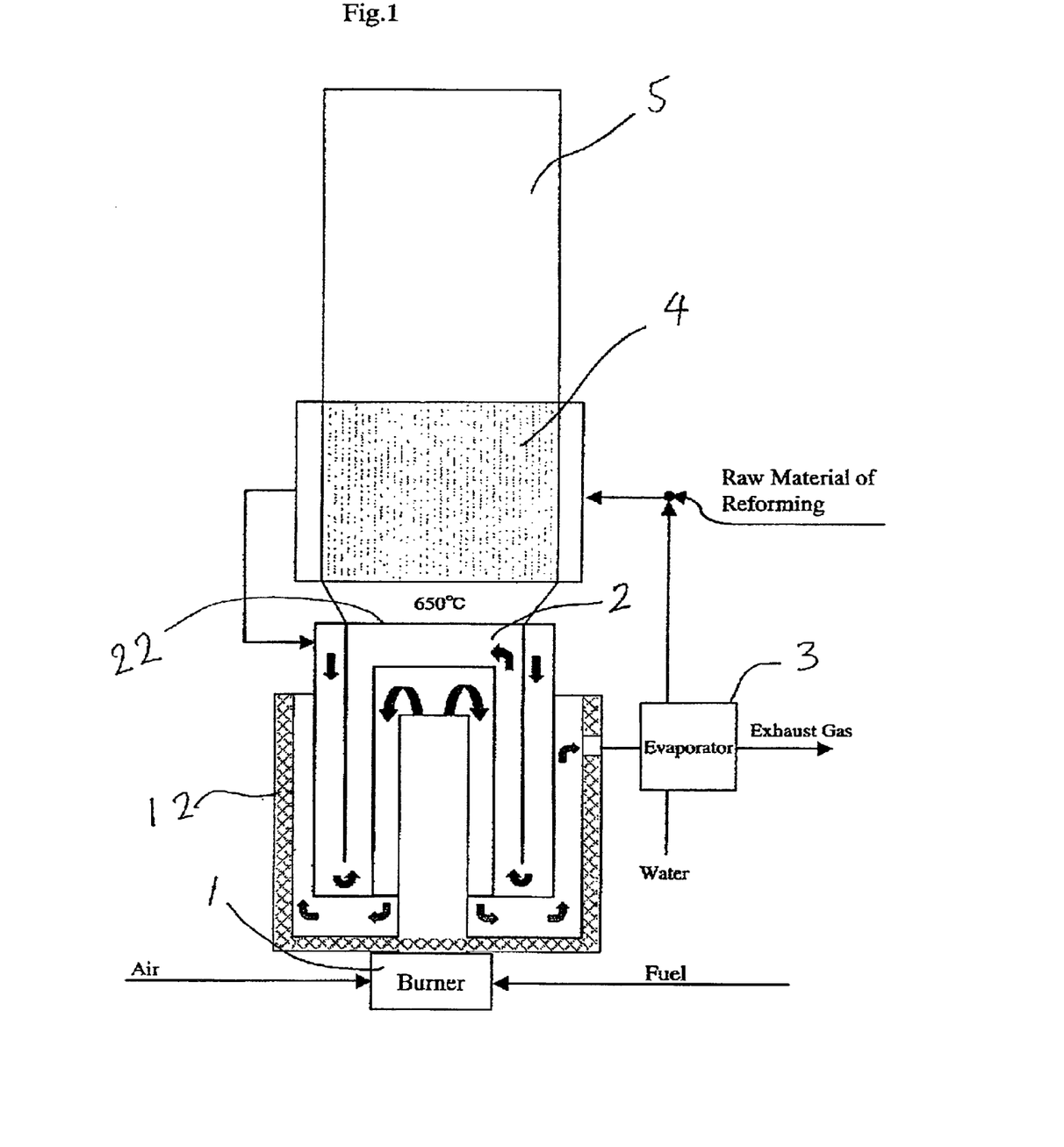
FIG. 1 is a diagram of a fuel reformer which is connected to a CO-shift device in accordance with the present invention.
Figure 2:
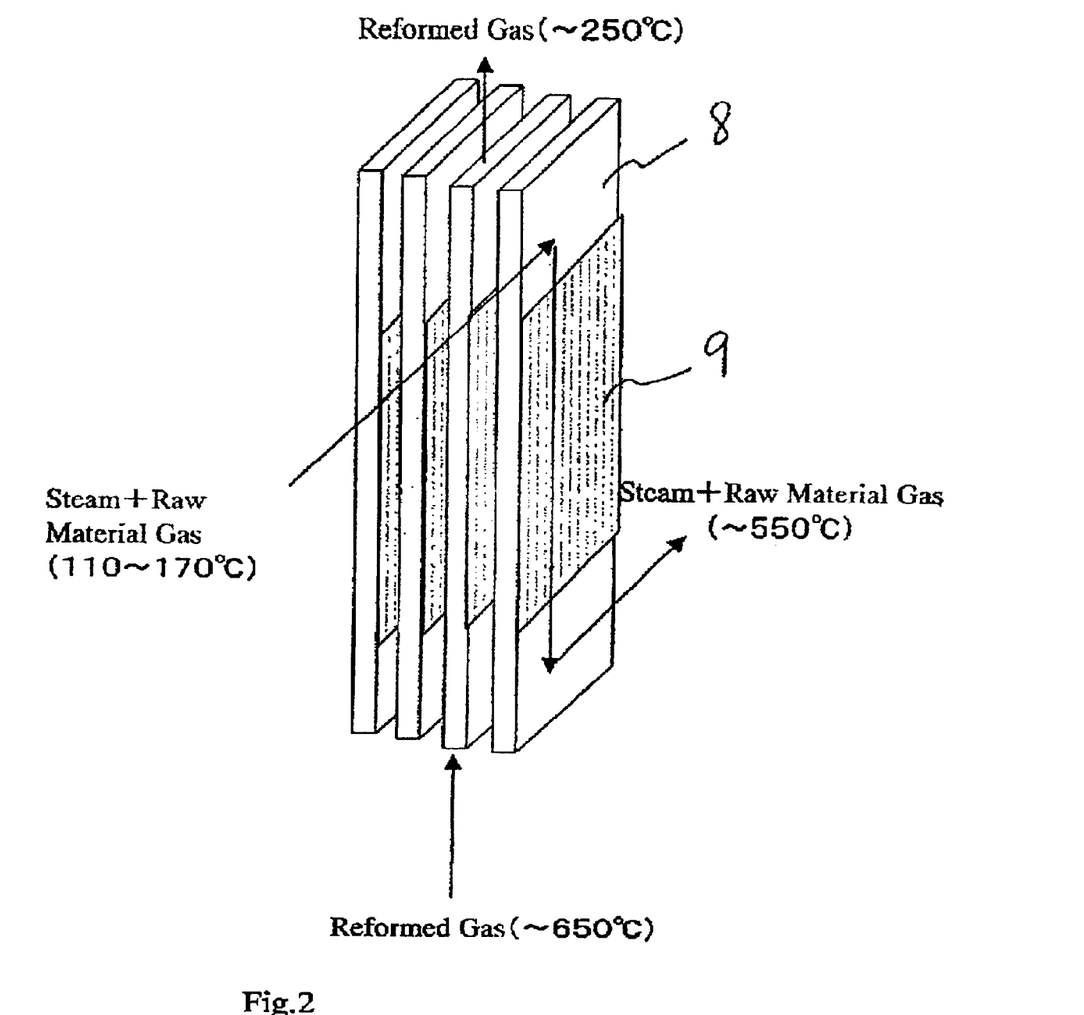
FIG. 2 is a perspective view illustrating how gases flow in a heat exchanger of the fuel reformer shown in FIG. 1.
Figure 3:
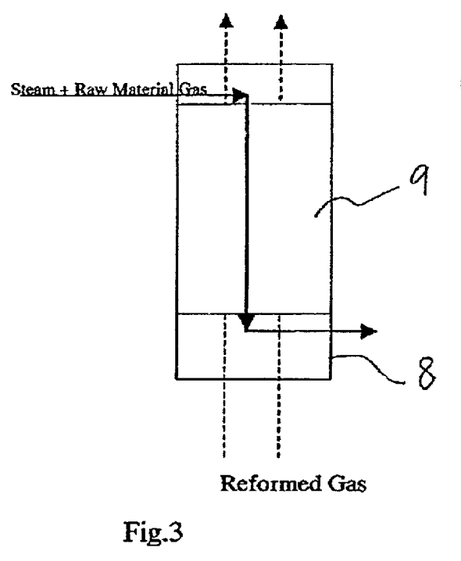
FIG. 3 is an explanative illustration of a cross-section of an outer fin of the heat exchanger of the fuel reformer shown in FIG. 1.
Figure 4:
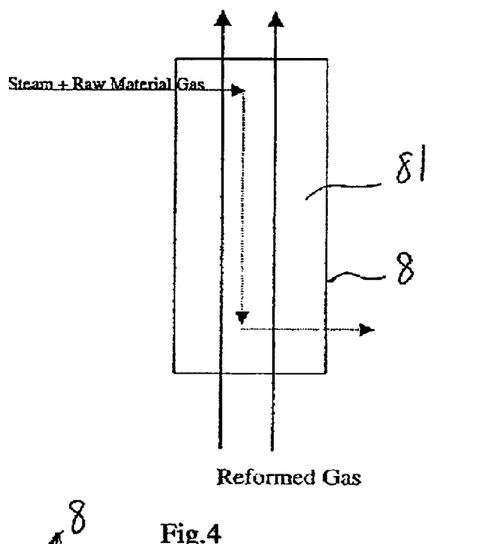
FIG. 4 is an explanative illustration of a cross-section of a tube of the heat exchanger of the fuel reformer shown in FIG. 1.
Figure 5:
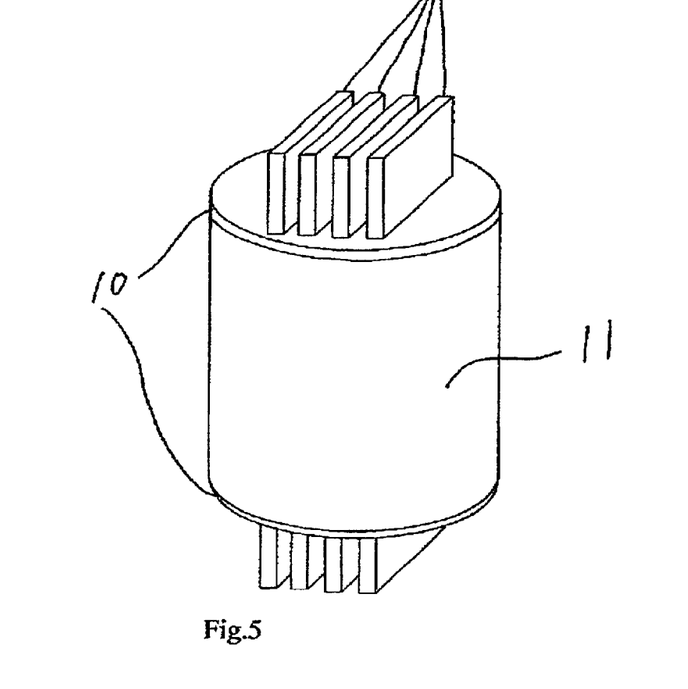
FIG. 5 is a perspective view illustrating an inner structure of the heat exchanger of the fuel reformer shown in FIG. 1.
Figure 6:
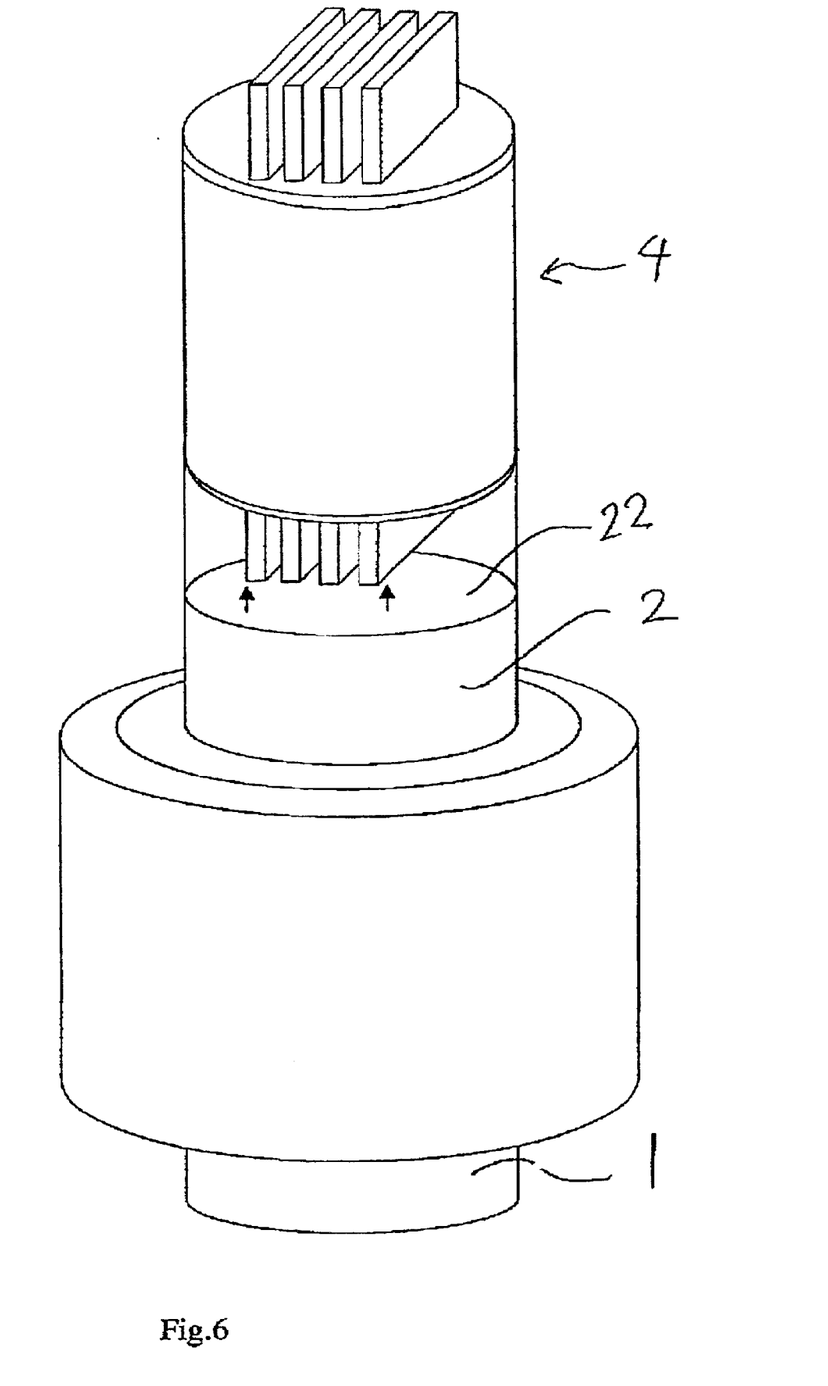
FIG. 6 is a perspective view illustrating how a burner, the reforming portion, and the heat exchanger are arranged in the fuel reformer.
Figure 7:
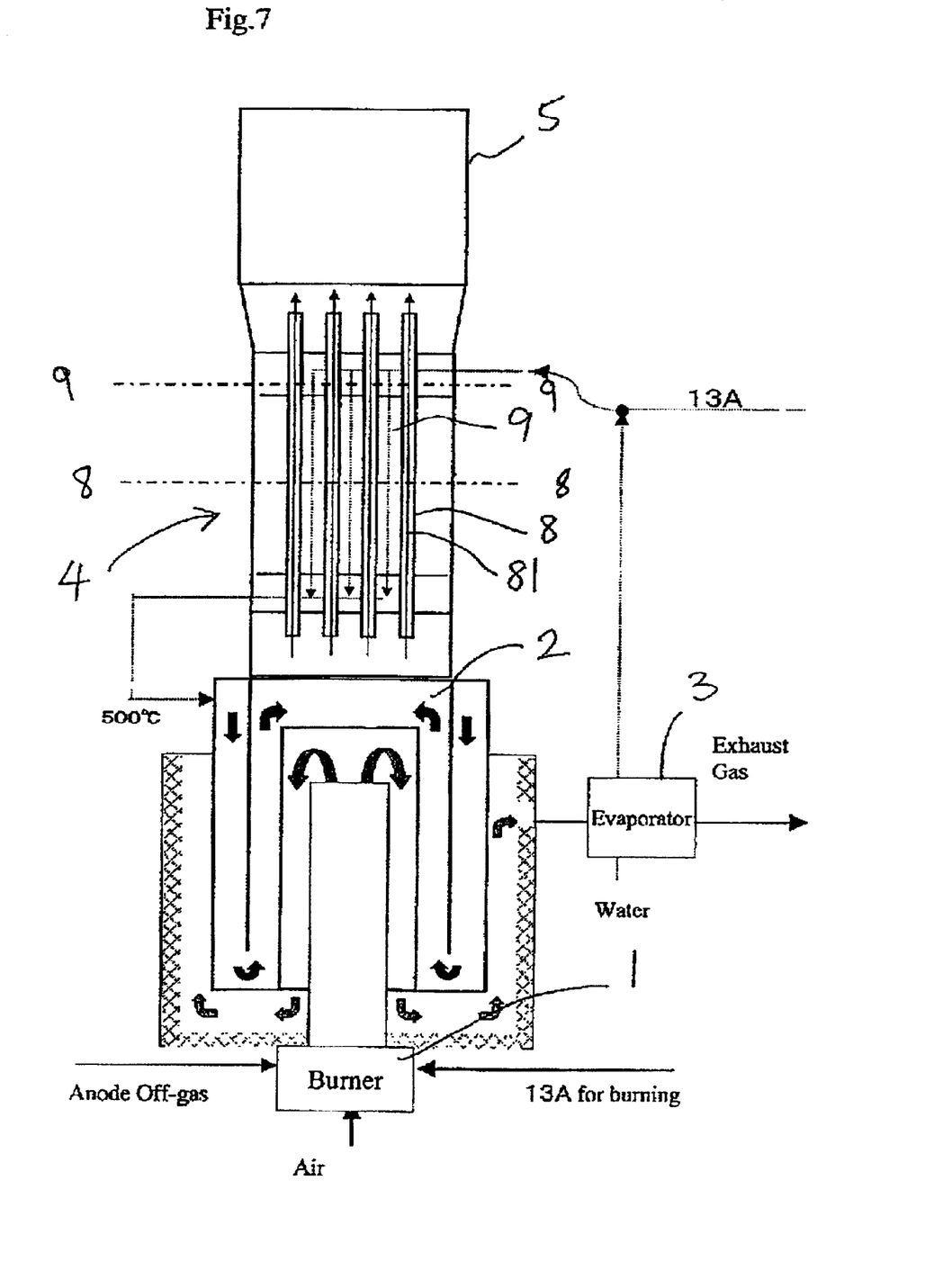
FIG. 7 is a block diagram illustrating how the reformed gas flows in the fuel reformer shown in FIG. 1.
Figure 8:
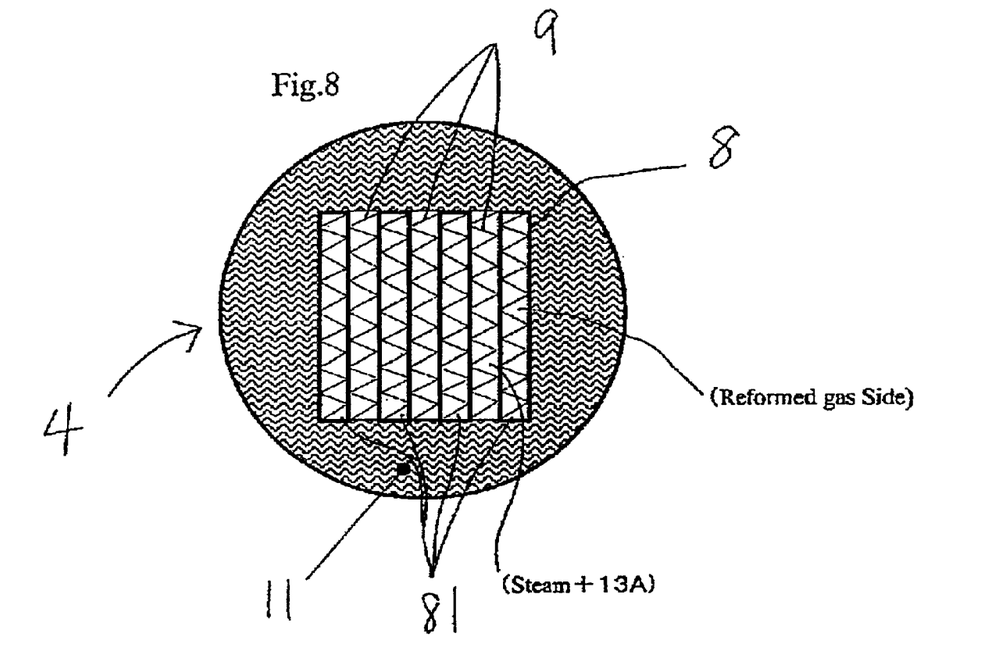
FIG. 8 is a cross-sectional view taken along line 8—8 in FIG. 7.
Figure 9:
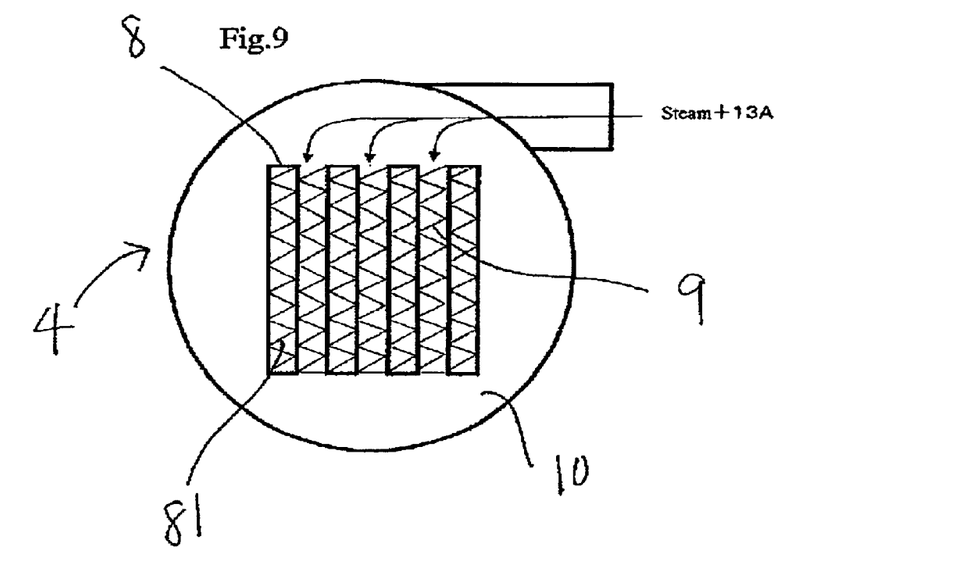
FIG. 9 is a cross-sectional view taken along line 9—9 in FIG. 7.

In detail, as shown in FIG. 1, the fuel reformer includes the flame forming burner 1, the reforming portion 2 which is formed of a ruthenium catalyst and whose exhaust port 22 is in direct connection with the higher temperature side of the heat exchanger 4 for supplying thereto the reformed gas, an evaporator 3 for supplying steam to the heat exchanger 4, which steam is produced by evaporating water with combustion exhaust gas. The heat exchanger 4 heat-exchanges the reformed gas from the reforming portion 2 with each of the raw material gas and the steam, and the heat-exchanged reformed gas is supplied to a CO-shift device 5 formed of a copper and zinc group catalyst.

In the present structure, a cylindrical reforming portion 2 is arranged in concentric fashion around the cylindrical burner 1. The exhaust port 22 of the reforming portion 2 is in direct connection to the higher temperature side of the heat exchanger 4, which requires no conduit for introduction of the reformed gas into the heat exchanger 4.

Outside the reforming portion 2, there is placed the evaporator 3 which produces the steam using the combustion exhaust gas resulting from heating the reforming portion 2.

As the heat exchanger 4, a counter-flow plate fin type heat exchanger is employed due to the fact that a plate fin heat exchanger can make heat transmission area per unit area larger and is high in temperature efficiency for lowering the temperature of the reformed gas from about 650° C. to 200° C.

Figure 10:
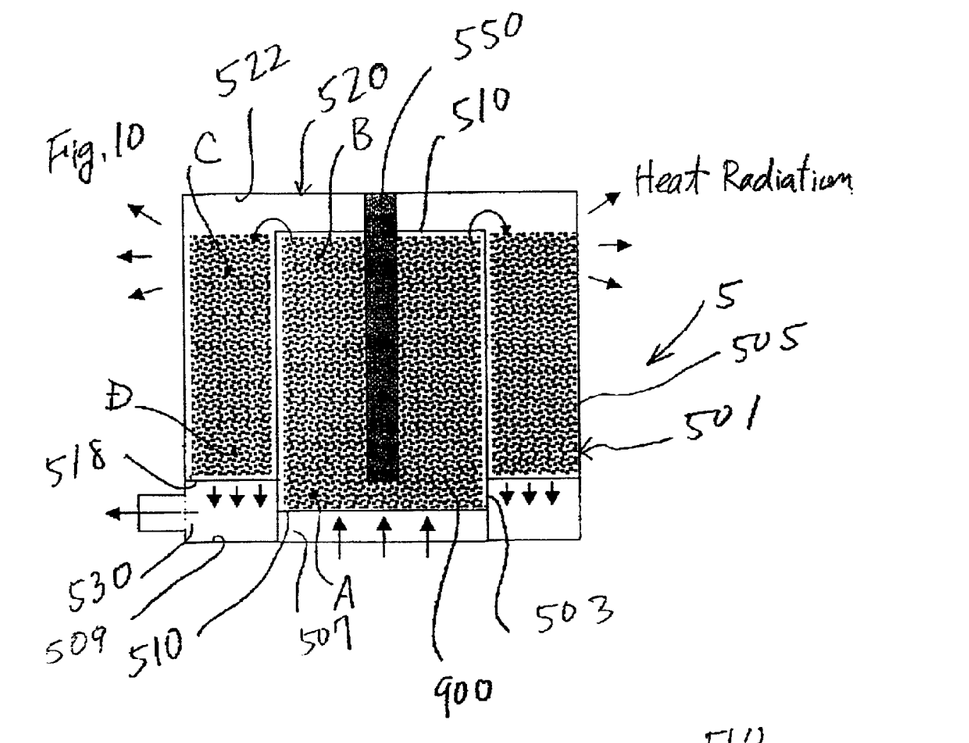
FIG. 10 is a cross-sectional view of a CO-shift device in accordance with the present invention.

The heat exchanger 4 includes a plurality of stainless steel tubes 8. Each of the tubes 8 has a rectangular cross-section (cf. FIG. 10(A)) or an oval cross-section (cf. FIG. 10(B)) and has an inner fin 81. The tubes 8 allow the reformed gas which comes from the reforming portion 2 to pass. A fin 9 is provided in sandwiched fashion in the path between two adjacent tubes 8. This path allows a manufactured or city gas as the raw material gas and the steam to pass.

In the above heat exchanger 4, a core potion which constitutes the counter-flow type plate fin heat exchanger is made up of the tubes 8 and the fins 9.

The reformed gas and each of the steam and the raw material gas, while flowing in the circuit shown in FIGS. 2 to 9 inclusive, establish a heat-exchange with each other. That is to say, the reformed gas which comes from the reformer passes through each of the tubes 8, while the city gas 13A as the raw material of reforming and the steam are passed through the paths having the fins 9, each of which is interposed between two adjacent tubes 8.

Between the inner surface of the heat exchanger 4 and the outer surface of each of the tubes 8, a stainless-steel material is interposed or provided for enabling the flow of the reformed gas around the set of the tubes 8, as well as for establishing heat insulation of the reformed gas from the outside of the heat exchanger 4.

The fuel reforming device having the above structure in accordance with the first embodiment of the present invention operates as follows:

The raw material of reforming, i.e., the city gas 13A whose main component is methane is mixed with the steam which is produced at the evaporator 3 and is introduced after being pre-heated up to about 500° C. in the heat exchanger 4 into the reforming portion 2. The resulting mixture, while being heated by the burner 1, causes a main chemical reaction and a side chemical reaction.

$CH_4 + H_2O \leftrightarrows CO + 3H_2$  [Main Chemical Reaction]

$CO + H_2O \leftrightarrows CO_2 + H_2$  [Side Chemical Reaction]

At this state, the burner 1 is adjusted in burning amount in order to make the output temperature of reformed gas about 650° C. The resultant gas which comes from the reforming portion 4 establishes heat exchange with the raw material gas to be cooled down to a temperature ranging from 200 to about 250° C., and causes a shift chemical reaction at the shift device 5 which is similar to the above-mentioned side chemical reaction. After completion of such a CO-shift, the CO-content is reduced to less than or equal to 1%.

The fuel reformer in accordance with the first embodiment of the present invention is made up of the burner 1 forming a flame, the reforming portion 2 surrounding the burner 1, having an exhaust port and exhausting the reformed gas from the exhaust port, and the heat exchanger 4 having a higher temperature side connected directly with the exhaust port of the refine portion 2, the heat exchanger 4 establishing heat exchange between the reformed gas and the raw material gas. Thus, the direct connection of the exhaust port of the reforming portion to the higher temperature side of the heat exchanger 4 is established, which makes the reforming portion 2 and the heat exchanger 4 substantially integral, resulting in less heat loss at a path from the reforming portion 2 to the heat exchanger 4.

The reforming portion 2 is concentric with the burner 1. The heat exchanged raw material gas flows from outer to inner circumferential areas of the reforming portion 2, respectively, while circulating in axially opposite directions, respectively. Thus, the combustion heat of the burner 1 can be transmitted efficiently to the reforming portion.

In addition, the evaporator 3 which generates steam using the heat of the exhaust gas is placed outside the reforming portion. Thus, steam can be produced at the evaporator 3 after efficient heat transmission from the burner 1 to the reforming portion 2, resulting in more efficient reforming.

In the fuel reformer, the heat exchanger 4 is of a counter-flow plate-fin type having metal plates such as a stainless steel. The steam, together with the raw material gas, is brought into heat exchange with the reformed gas, and the resulting steam and raw material gas are fed to the reforming portion. Thus, a relatively large heat transfer area per unit area and higher-efficient convection can be realized, which makes it possible to establish effective heat exchange between the reformed gas and each of the steam and the raw material gas. In addition, the resultant or heat exchanged steam and raw material gas are fed to the reforming portion, which makes the reforming much higher in efficiency.

In addition, in the fuel reformer, the heat exchanger 4 includes a plurality of tubes 8, each of the tubes 8 being provided therein with a plurality of fins 9. The reformed gas flows through the tubes 8, and both the steam and the raw material gas flow through a passage defined between the tubes 8. Thus, the reformed gas can be brought into efficient heat exchange 4 with each of the steam and the raw material gas.

Moreover, in the fuel reformer, the stainless steel material 11 is provided in the volume 10 of the heat exchanger 4, which ensures flowing the reformed gas along the tubes 8 and establish heat insulation of each of the tubes 8 from the outside of the heat exchanger 4.

Referring now to FIG. 10, the CO-shift device 5 includes a main body 501 which is made up of an inner cylindrical member 503 and an outer cylindrical member 505 which are coaxially arranged. In the inner cylindrical member 503, there is defined an inner space; while an outer space is defined between the inner cylindrical. member 503 and the outer cylindrical member 505. An inlet portion 507 is formed at a lower end of the inner cylindrical member 503 for introducing the reformed gas containing therein the steam from the heat exchanger 54 into the inner space.

Figure 11:
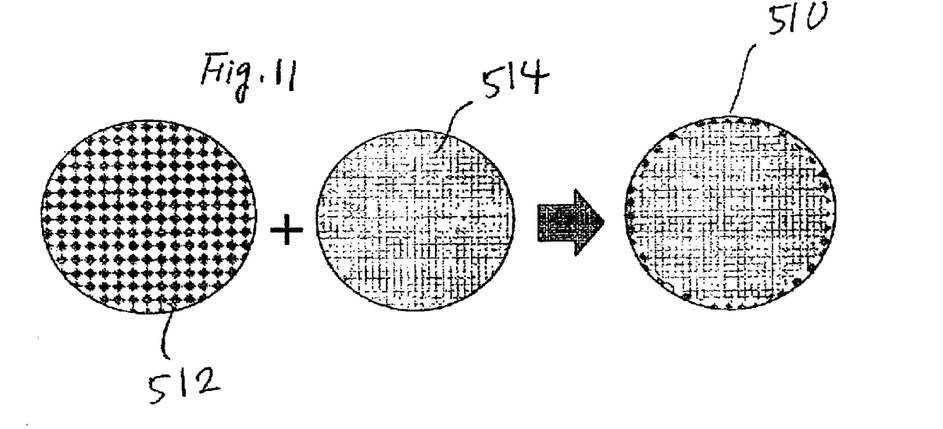
FIG. 11 is an explanation view of a support device for supporting a catalyst.

In the inner space, a catalyst 900 in the form of a multiplicity of particles (i.e. a pellet catalyst) is provided in such a manner that the CO-catalyst is held between a pair of vertically spaced support plate 510. As best shown in FIG. 11, the support plate 510 is made up of a punched plate 512 formed therein with a regularly arranged very small punched holes, and a wire plate 514 superimposed on the punched plate 512, each having an opening diameter less than a diameter of the catalyst particles. Making the wire plate 514 contact the catalyst 900 results in establishment of smooth flow of the reformed gas in the catalyst 900 such that the catalyst particles will not pass through the holes of the punched plate 512. The punched plate 512 has a 40% open area ratio. The wire plate 514 is formed by woven wires, each of which has a mesh diameter of 0.43 mm. In the outer space, the catalyst 900 is also supported by a ring-shaped support plate 518 which is identical to the support plate 510 except for its shape.

Upper portions of the respective inner cylindrical member 503 and outer cylindrical. member 505 are connected by a redirecting portion 520 which does not possess a catalyst. The reformed gas reaching the redirecting portion 520 after passing through the catalyst 900 in the inner space reflects on a wall 522 and passes through the catalyst 900 in the outer space. Then, the reformed gas is exhausted from an outlet 530 which is formed at a lower end of the outer cylindrical member 505 in such a manner that the outlet 530 extends horizontally by being defined by a wall 509 and the support plate 518.

While the reformed gas flows through the catalyst 900 in the inner space of the main body 501 until reaches the redirecting portion 520, the following chemical reaction occurs in its rightward direction.

$CO+H_2O \leftrightarrows H_2+CO2+Q$ (Heat Generation)

During the upward movement of the reformed gas in the catalyst 900 in the inner space, a temperature gradient appears such that the temperature becomes higher and lower at radially inward and outward portions in the inner space. However, as soon as the reformed gas moves into the redirecting portion 520, such an unbalance is corrected. In addition, when the reformed gas is reflected by the wall of the redirecting portion 520, heat radiation occurs thereat at a higher heat transfer rate. Thus, the heat generated in the above chemical reaction is capable of radiated outside the main body 501, which causes the equilibrium state of the above chemical reaction to shift in the rightward direction, thereby proceeding the shift reaction to further reduce CO.

As described above, near the inlet side of the CO-shift device 5, the shift reaction can proceed at a higher speed while keeping the temperature at a higher level. On the other hand, near the outlet side of the CO-shift device 5, since the shift reaction can proceed while establishing heat radiation in the outward direction, the temperature of the reformed gas is lowered, which makes it possible to shift the equilibrium state of the above chemical reaction in the rightward direction. Thus, the CO-concentration at the outlet port 530 can be lowered.

Figure 14:
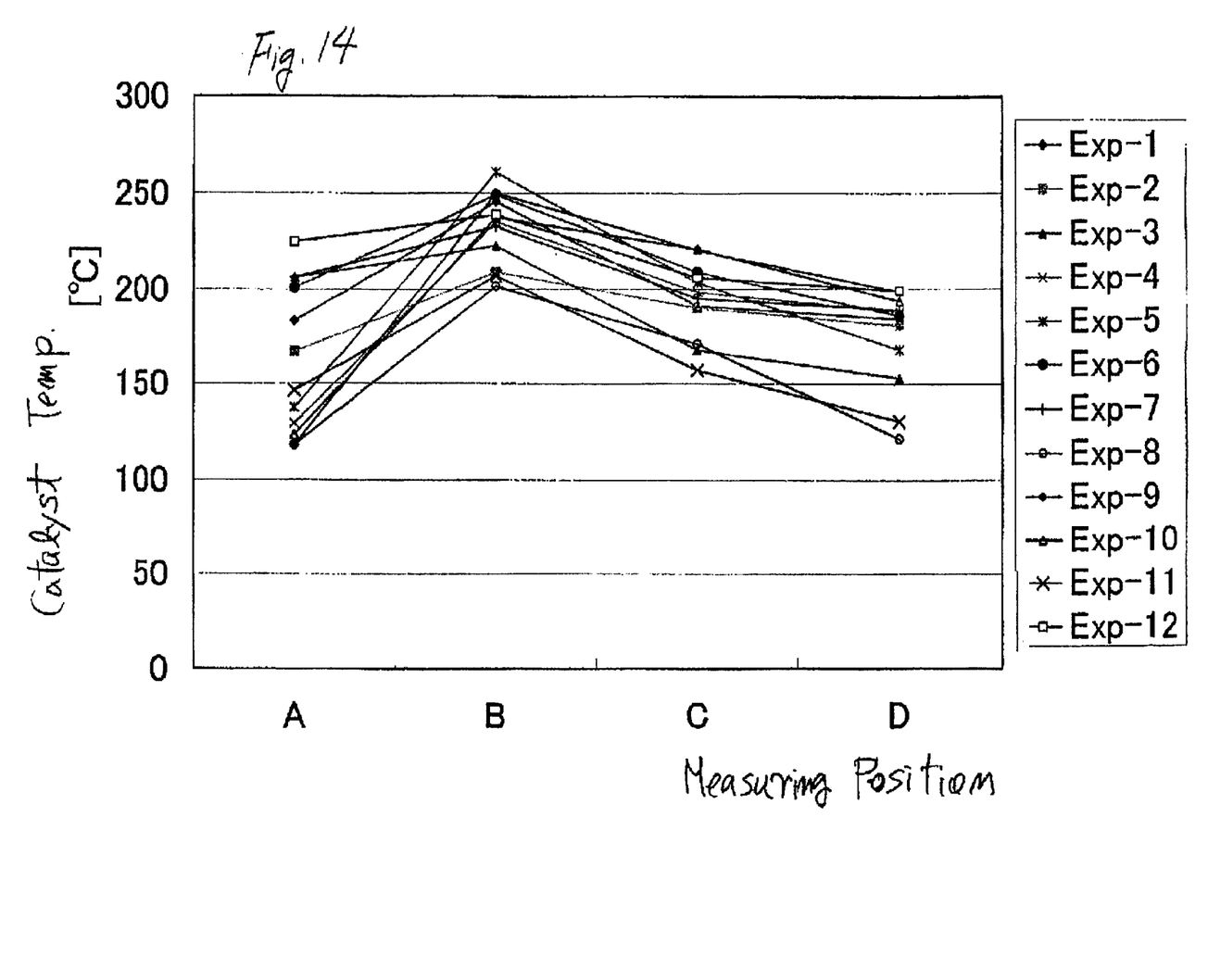
FIG. 14 is a graph representing experimental results of temperature distribution in the CO-shift device.

The CO-shift device 5 having the above-described structure causes the temperature distribution in the catalyst 900 to begin to decrease gradually to temperatures of about 120–200° after redirecting the flow of the reformed gas. This is apparent from the graph depicted in FIG. 14 representing experiment results. In the graph, codes A, B. C, and D correspond to measuring positions A, B, C, and D in FIG. 10.

Figure 15:
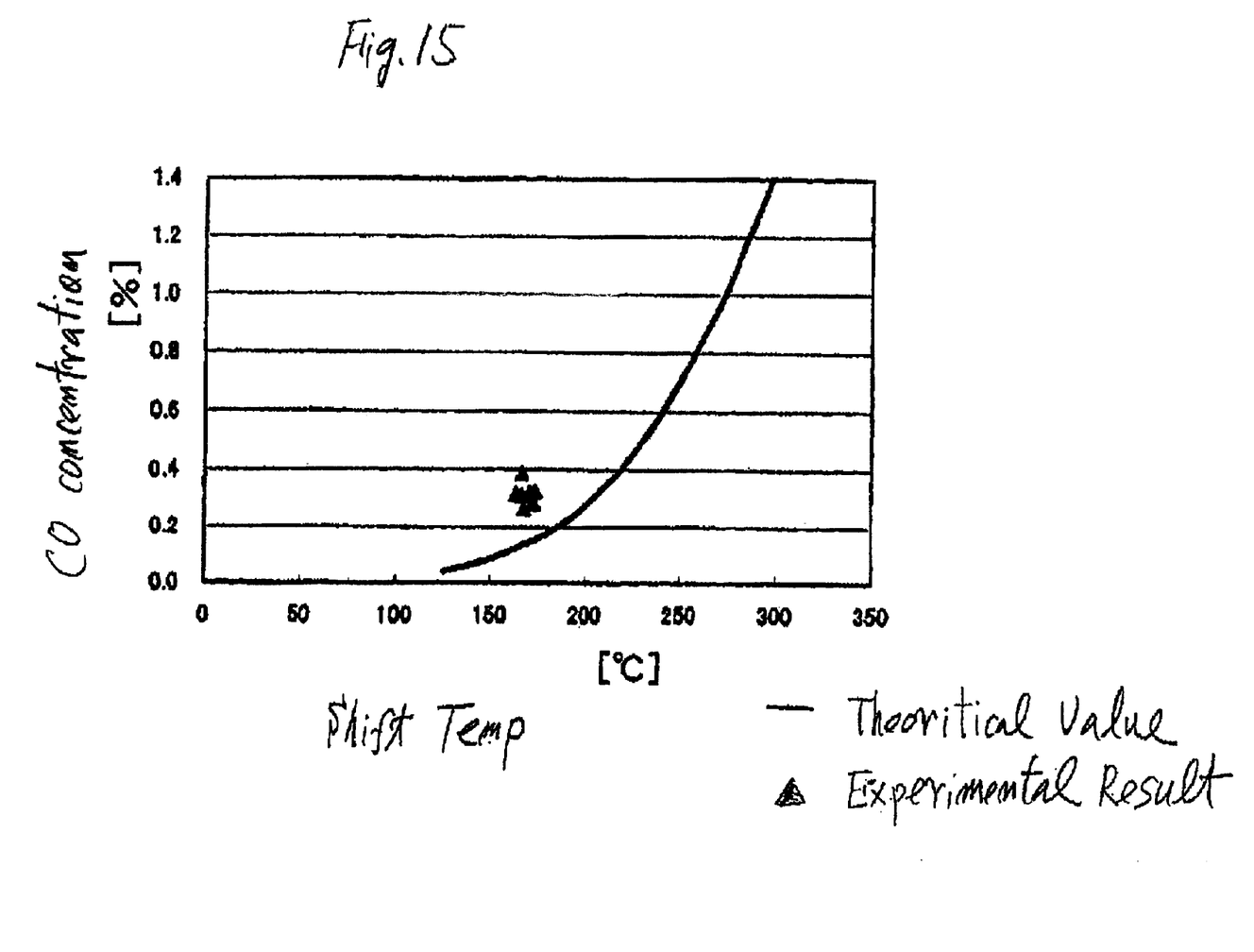
FIG. 15 is a graph representing of shift temperature vs. CO-concentration.

FIG. 15 shows a relationship between the CO-concentration and the shift temperature which is obtained though experiments performed under the following conditions.

S/C=3, where S/C represents a ratio of carbon in the steam relative to carbon in the reformed gas.

Temperature of reformed gas at the outlet of the reformer 2: 680±15° C.

As can be clearly understood from this graph, the CO-concentration is reduced approximately to the equilibrium concentration.

It is to be noted that in the above structure, a heater 550 is provided along an axis of the inner space in order to attain an earlier active temperature of the catalyst 900.

Figure 12:
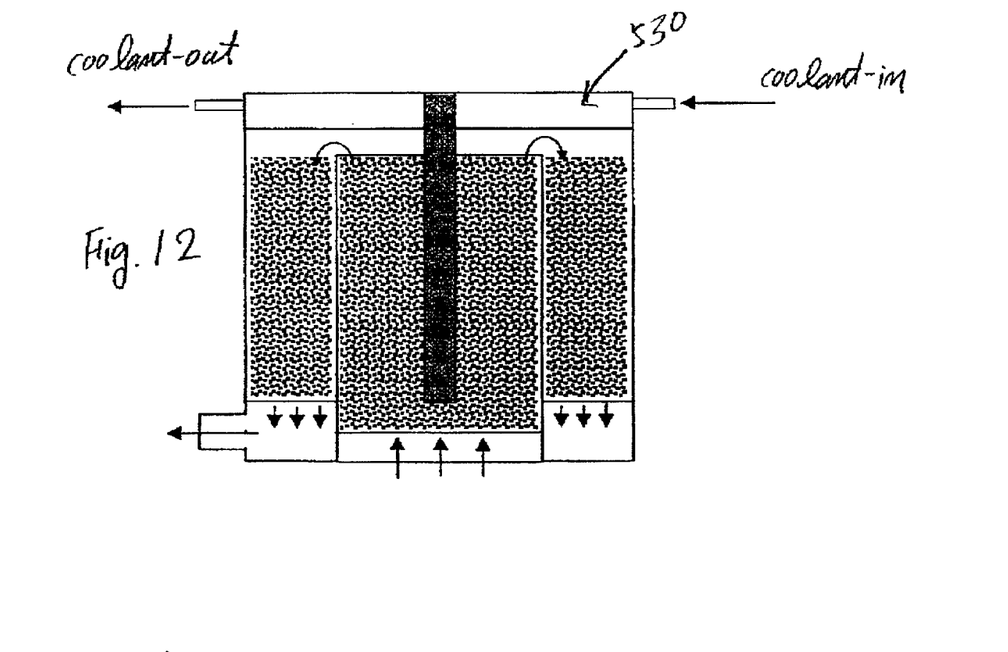
FIG. 12 is a cross-sectional view of a first modification of the CO-shift device shown in FIG. 10.
Figure 13:
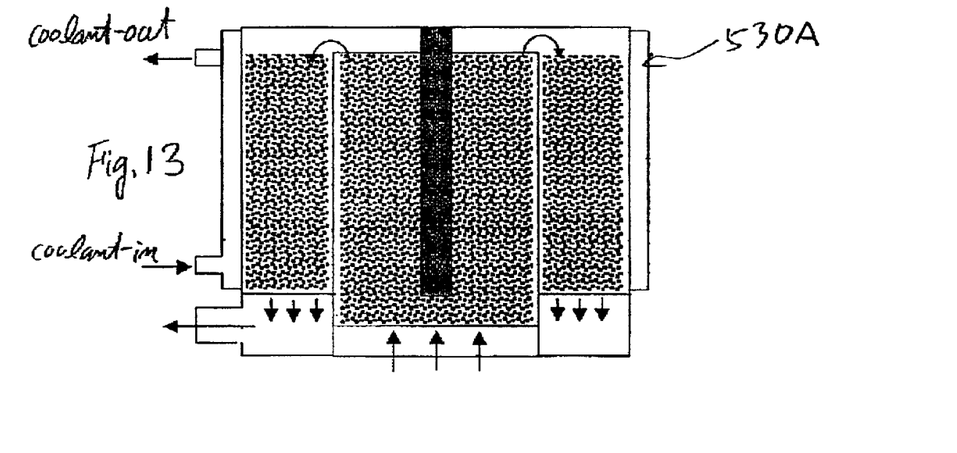
FIG. 13 is a cross-sectional view of a second modification of the CO-shift device shown in FIG. 10.

In addition, as shown in FIGS. 12 and 13, cooling devices 530, 530A are provided at the redirecting portion and are provided on an outer surface of an outer wall of the main portion 501, respectively. The cooling device 530 or 530A is designed to pass a coolant though its inner passage so as to recover heat from the heat generation during the CO-shift reaction. The coolant can be selected from the air to be fed to the burner 51, the fuel, and the raw material of reformed gas.

Figure 16:
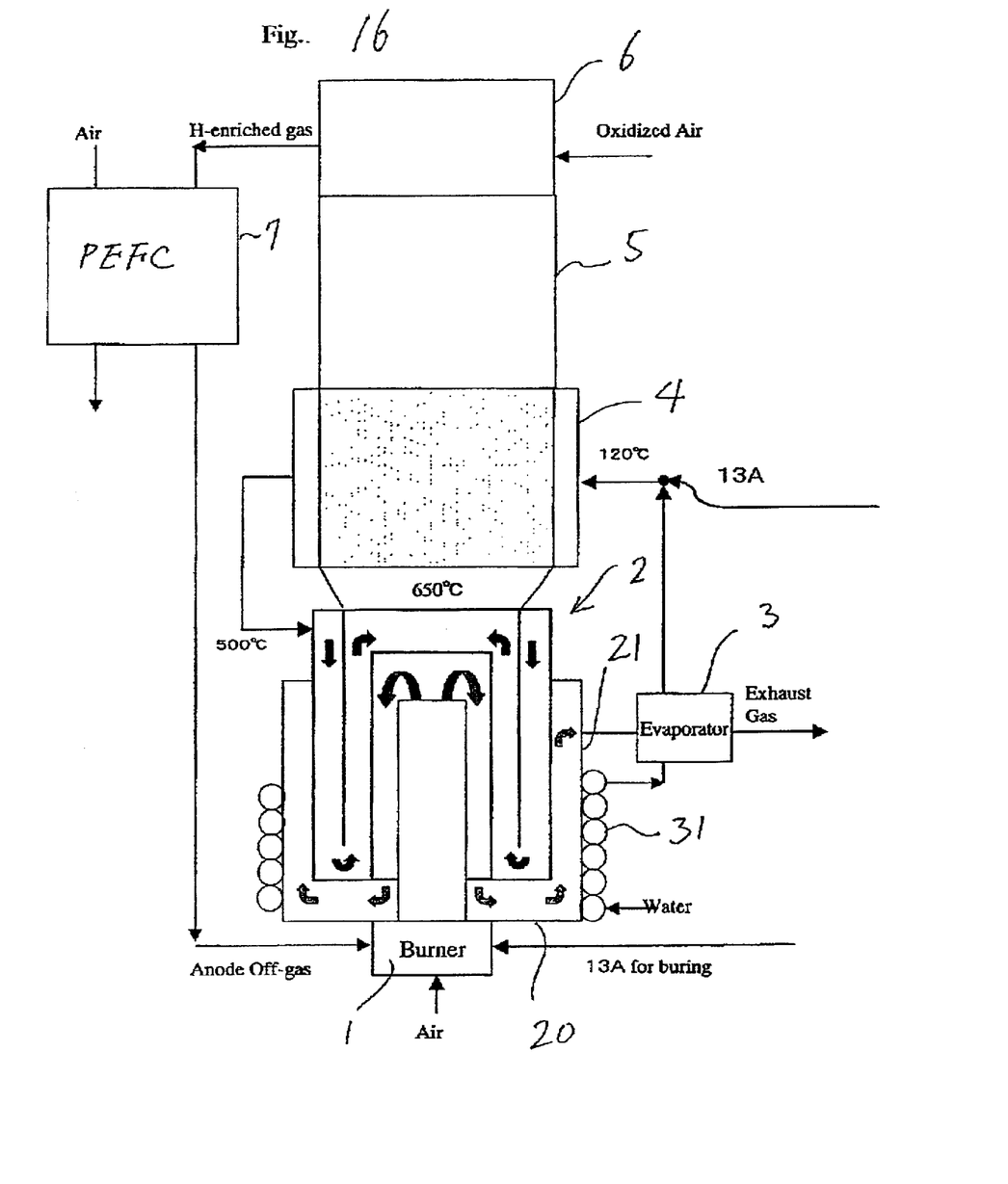
FIG. 16 is a diagram of another fuel reformer to which the CO-shift device in accordance with the present invention can be connected.

It is to be noted that the CO-shift device 5 can be connected to a fuel reformer which is illustrated in FIG. 16. This fuel reformer is identical with the above-described fuel reformer except that water to be introduced into the evaporator 3 passes through a conduit 31 which is spirally arranged or wound on the reforming portion 2. Hereinafter, only such a major difference and other related minor differences will be described.

In a PEFC type fuel cell 7 which utilizes natural gas, the CO-content in the natural gas to be introduced into the fuel cell 7 should be limited equal to or less than 10 ppm for restricting possible CO-poisoning. Thus, a selective oxidizing portion 6 which is formed of ruthenium catalyst is provided after shifting in order to reduce the CO-content to be equal to or less than 10 ppm, by causing the following chemical reaction.

$CO+(½)O_2 \rightarrow CO_2$

In the exhaust gas, an amount of hydrogen gas is contained due to the fact the actually consumed amount of the hydrogen gas is as high as 90–95% % of the amount of the hydrogen gas introduced into the fuel cell 7. This remaining gas, i.e., the off gas at the anode electrode of the fuel cell 7, is used as a part of the fuel to be burned at the burner 1 which is placed in the reforming portion 2.

On the other hand, water is fed into the evaporator 3 by way of the conduit 31 which is spirally arranged on the outer wall 21 of the cylinder portion 20 such that the water is heated or warmed up to a temperature during its movement in the conduit 31. The outer wall 21 defines therein a flow path which allows the exhaust gas from the burner 1 to flow upwardly and downwardly at its inner portion and outer portion, respectively.

In the present device, the radiated heat from the reforming portion 2 is recovered by arranging the conduit 31 in spiral fashion around the reforming portion 2, which further improves the heat efficiency.

The invention has thus been shown and described with reference to specific embodiments. However, it should be understood that the invention is in no way limited to the details of the illustrated structures, but changes and modifications may be made without departing from the scope of the appended claims.

What is claimed is:

1. A CO-shift device comprising:

a main body having therein a space in which a CO-shift catalyst is accommodated, the space being divided into an inner space accommodating said CO-shift catalyst and an outer space surrounding the inner space and accommodating said CO-shift catalyst;

an inlet portion formed at an end portion of the inner space, the inlet portion being adapted to be supplied with a reformed gas such that the reformed gas can flow through the inner space;

an outlet portion formed at an end portion of the outer space; and a redirecting portion provided between the inner space and the outer space, the redirecting portion being positioned and configured to reverse a reformed gas flowing through the inner space in order that the reformed gas passes through the outer space to be exhausted from the outlet portion, the reformed gas being shifted to reduce CO by the CO-shift catalyst during movement of the reformed gas through the inner and outer spaces, wherein said CO-shift catalyst is accommodated in said outer space adjacent said redirecting portion.

2. A CO-shift device as set forth in claim 1, wherein the main body comprises inner and outer cylindrical members having a common axis, the inner space being defined in the inner cylindrical member, the outer space being defined between the inner and outer cylindrical members.

3. A CO-shift device as set forth in claim 1, wherein the redirecting portion does not contain a catalyst.

4. A CO-shift device as set forth in claim 1, further comprising a catalyst support plate positioned in the main body to support the shift catalyst, the catalyst support plate being comprised of a punched plate and a superimposed mesh plate, each of holes of each of the plates being smaller than a catalyst particle diameter.

5. A CO-shift device as set forth in claim 1, further comprising a heat-recovering device in the form of a passage formed on an outer surface of an outer wall of the main body, for recovering heat generated during CO-shift reaction, the passage of the heat-recovering device being adapted to hold a coolant fluid.

6. A CO-shift device comprising:

a main body having therein a space in which a CO-shift catalyst is accommodated, the space being divided into an inner space accommodating said CO-shift catalyst and an outer space surrounding the inner space and accommodating said CO-shift catalyst;

an inlet portion formed at an end portion of the inner space, the inlet portion being adapted to be supplied with a reformed gas such that the reformed gas can flow through the inner space;

an outlet portion formed at an end portion of the outer space; and redirecting means provided between the inner space and the outer space for reversing a flow of a reformed gas flowing through the inner space, wherein said CO-shift catalyst is accommodated in said outer space adjacent said redirecting means.

7. A CO-shift device as set forth in claim 6, further comprising means for cooling the reformed gas in said redirecting means.

8. A CO-shift method comprising the steps of:

introducing a reformed gas through an inlet of an inner space of a main body of a shift reactor, a CO-shift catalyst being accommodated in the inner space;

reversing a flow direction of the reformed gas in a redirecting portion after the reformed gas has flowed through the inner space;

flowing the reversed reformed gas from the inner space of the main body through an outer space of the main body which surrounds the inner space, wherein a CO-shift catalyst is accommodated in the outer space; and discharging the reformed gas from an outlet portion of the outer space.

9. A CO-shift method as set forth in claim 8, wherein the redirecting portion does not contain a catalyst.

10. A CO-shift method as set forth in claim 9, wherein said reversing step comprises a step of reflecting the reformed gas off of an external wall of the shift reactor.

11. A CO-shift method as set forth in claim 8, further comprising a step of cooling the reformed gas in said redirecting portion.

12. A CO-shift method as set forth in claim 10, further comprising a step of cooling the reformed gas in said redirecting portion.

\* \* \* \* \*